(12) United States Patent
Que

(10) Patent No.: US 9,671,092 B2
(45) Date of Patent: Jun. 6, 2017

(54) BACKLIGHT MODULE AND DISPLAY DEVICE USING THE BACKLIGHT MODULE

(71) Applicant: Shenzhen China Star Optoelectronics Technology Co., Ltd., Shenzhen, Guangdong (CN)

(72) Inventor: Chengwen Que, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 256 days.

(21) Appl. No.: 14/438,595

(22) PCT Filed: Nov. 5, 2014

(86) PCT No.: PCT/CN2014/090311
§ 371 (c)(1),
(2) Date: Apr. 24, 2015

(87) PCT Pub. No.: WO2016/061853
PCT Pub. Date: Apr. 28, 2016

(65) Prior Publication Data
US 2016/0273740 A1    Sep. 22, 2016

(30) Foreign Application Priority Data
Oct. 22, 2014  (CN) .......................... 2014 1 0567941

(51) Int. Cl.
*G02F 1/1335* (2006.01)
*F21V 19/00* (2006.01)

(52) U.S. Cl.
CPC ............ *F21V 19/00* (2013.01); *G02F 1/1335* (2013.01)

(58) Field of Classification Search
CPC ... G02F 1/1335; G02F 1/133308; F21V 19/00
USPC ....................................... 362/97.1
See application file for complete search history.

(56) References Cited

U.S. PATENT DOCUMENTS

2014/0028948 A1* 1/2014 Hsiao ................ G02F 1/133308
349/58

* cited by examiner

*Primary Examiner* — Karabi Guharay
(74) *Attorney, Agent, or Firm* — Andrew C. Cheng

(57) ABSTRACT

A backlight module and an engagement fitting thereof, and a display device using the backlight module are provided. The backlight module includes: a rear shell including a back plate and a side plate formed with an assembly hole; a middle frame engaged with the side plate and formed with an engagement portion extending toward the assembly hole; and an engagement fitting disposed in a receiving space and adjacent to the side plate. The engagement fitting includes a buckling member and an engagement member penetrating through the assembly hole, the buckling member is for buckling with an optical component set, the engagement member is for engaging with the engagement portion, and thereby achieving tight engagement of the rear shell, the middle frame and the optical component set. The present invention can effectively simplify the structure of the backlight module, improve the structural strength and reduce the production cost.

18 Claims, 3 Drawing Sheets

BACKLIGHT MODULE AND DISPLAY DEVICE USING THE BACKLIGHT MODULE

TECHNICAL FIELD

The present invention relates to the field of display technology, and particularly to an engagement fitting, a backlight module using the engagement fitting, and a display device using the backlight module.

DESCRIPTION OF RELATED ART

In the prior art, as shown in FIG. 1, a structure of a liquid crystal module of a display device mainly includes a front frame 10, a middle frame 11, a rear shell 12, a display panel 13 and an optical component set 14. In order to achieve the goal of fixing, the middle frame 11 is formed with a first engaging hook 110, the rear shell 12 is formed with a second engaging hook 120, by the engagement of the first engaging hook 110 with the second engaging hook 120, the middle frame 11 is fixed and thereby the overall assembly is completed.

However, since the limit of cold stamping process, the dimension parameter of the second engaging hook 120 has certain dimension restriction, as shown in FIG. 2, according to the design requirement of stamping molding, if the rear shell 12 has a thickness T, minimum requirements of related dimension parameters of a side plate of the rear shell 12 are about that: H1≥1.5 T, H2≈a height of convex hull, H3≥1.5 T, H4≥3 T, the setting of these parameters needs to meet the minimum requirements of the bent slider course, and therefore a current relatively safe height H of the side plate of the rear shell 12 is designed to be about larger than or equal to 6 T plus the height of convex hull of the second engaging hook 120. It is not difficult to be found that the conventional design would affect the space of product in the thickness direction and is adverse to the slim design of product.

Meanwhile, the structures of the first engaging hook 110 and the second engaging hook 120 only can satisfy the requirement of fixing the middle frame 11, and an additional fixing structure is needed to fix the optical component set 14 inside the backlight module, which is adverse to the functional diversification of parts design and results in the increase of production cost because of the complicated structure.

Therefore, how to meet both the requirements of simple structure and high structural strength of the backlight module has become a major problem in the art.

SUMMARY

Accordingly, embodiments of the invention provide a backlight module and an engagement fitting thereof, and a display device using the backlight module, which not only can effectively simplify the structure of the backlight module but also can improve the structural strength and reduce the production cost of the backlight module.

In order to solve the above technical problem, an embodiment of the invention provides a backlight module. The backlight module includes a rear shell, a middle frame and an engagement fitting.

The rear shell includes a back plate and a side plate. The side plate is disposed at the periphery of the back plate and defines a receiving space for accommodating an optical component set of the backlight module. The side plate is formed with an assembly hole.

The middle frame is disposed engaging with the side plate and restricting the optical component set accommodated in the receiving space. The middle frame is formed with an engagement portion extending toward the assembly hole.

The engagement fitting is disposed in the receiving space and adjacent to the side plate. The engagement fitting includes a buckling member and an engagement member penetrating through the assembly hole, the buckling member is configured (i.e., structured and arranged) for buckling with the optical component set, the engagement member is configured for engaging with the engagement portion of the middle frame, and thereby achieving tight engagement of the rear shell, the middle frame and the optical component set.

In an exemplary embodiment, the engagement fitting includes a main body and an elastic member connected to the main body. The engagement member is formed extending from the elastic member toward the assembly hole.

In an exemplary embodiment, the elastic member includes a first end, a second end, and a deformable portion between the first end and the second end. The first end and the second end are individually connected with the main body. The deformable portion and the main body are disposed spaced from each other and define an elastic stopper slot therebetween.

In an exemplary embodiment, a protruding portion of the engagement member penetrating through the assembly hole and engaged with the engagement portion of the middle frame is formed with a guiding structure, to thereby allow the protruding portion to withdraw into the assembly hole when the engagement portion presses the guiding structure during assembly and to eject from the assembly hole to engage with the engagement portion when the assembly is completed.

In an exemplary embodiment, the buckling member is formed extending from the main body along a direction facing away from the back plate and configured for engaging with an ear-like structure of the optical component set.

In an exemplary embodiment, the engagement fitting is fixed on the back plate by screwing, riveting, adhering or engagement.

In an exemplary embodiment, the engagement fitting is formed with at least two threaded holes and thereby is fixed on the back plate by screws.

In order to solve the above technical problem, an embodiment of the invention further provides an engagement fitting for a backlight module. The engagement fitting is configured to be disposed in a rear shell of the backlight module and adjacent to a side plate of the rear shell. The engagement fitting includes a buckling member and an engagement member configured for penetrating through the side plate, the buckling member is configured for buckling with an optical component set of the backlight module, the engagement member is configured for engaging with a middle frame of the backlight module, and thereby to achieve tight engagement of the rear shell, the middle frame and the optical component set of the backlight module.

In order to solve the above technical problem, an embodiment of the invention still further provides a display device. The display device includes a display panel and any one of the above described backlight modules. The display panel is secured on the middle frame and disposed opposite to the optical component set. The number/amount of the engagement fitting is multiple (i.e., more than one), and the multiple engagement fittings are disposed spaced from each other.

In an exemplary embodiment, the display device further includes a front frame engaged with the middle frame and thereby to fix the display panel cooperative with the middle frame.

By adopting the above technical solutions, the efficacy of the invention is that: the embodiments of the invention provide the engagement fitting and uses the engagement fitting to realize the fixing of both the middle frame and the optical component set, which can avoid the technical drawbacks of being difficult to achieve light, thin and simple of product caused by excessively large thickness and height of the side plate of the rear shell in the prior art. Accordingly, the invention not only can effectively simplify the structure of the backlight module but also can improve the structural strength as well as reduce the production cost.

BRIEF DESCRIPTION OF THE DRAWINGS

In order to more clearly illustrate the technical solutions of various embodiments of the present invention, drawings will be used in the description of embodiments will be given a brief description below. Apparently, the drawings in the following description only are some embodiments of the invention, the ordinary skill in the art can obtain other drawings according to these illustrated drawings without creative effort. In the drawings.

DETAILED DESCRIPTION OF EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Figure 1:
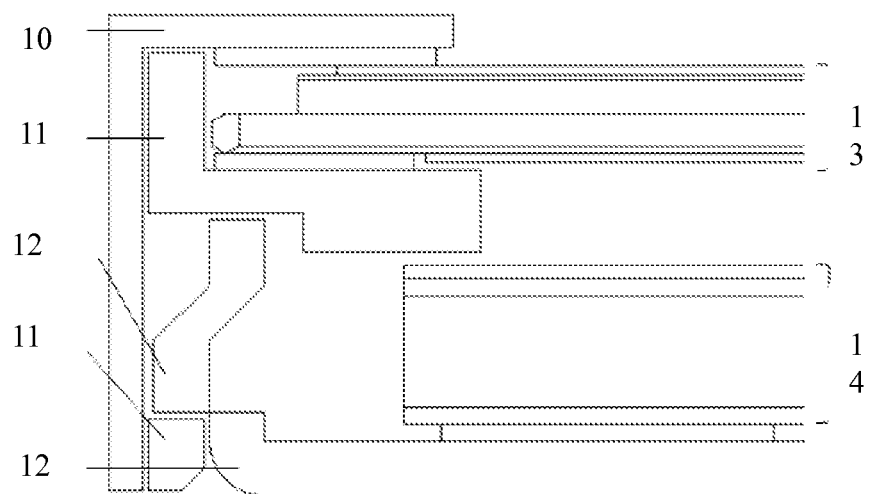
FIG. 1 is a schematic partial structural view of a display device in the prior art.
Figure 2:
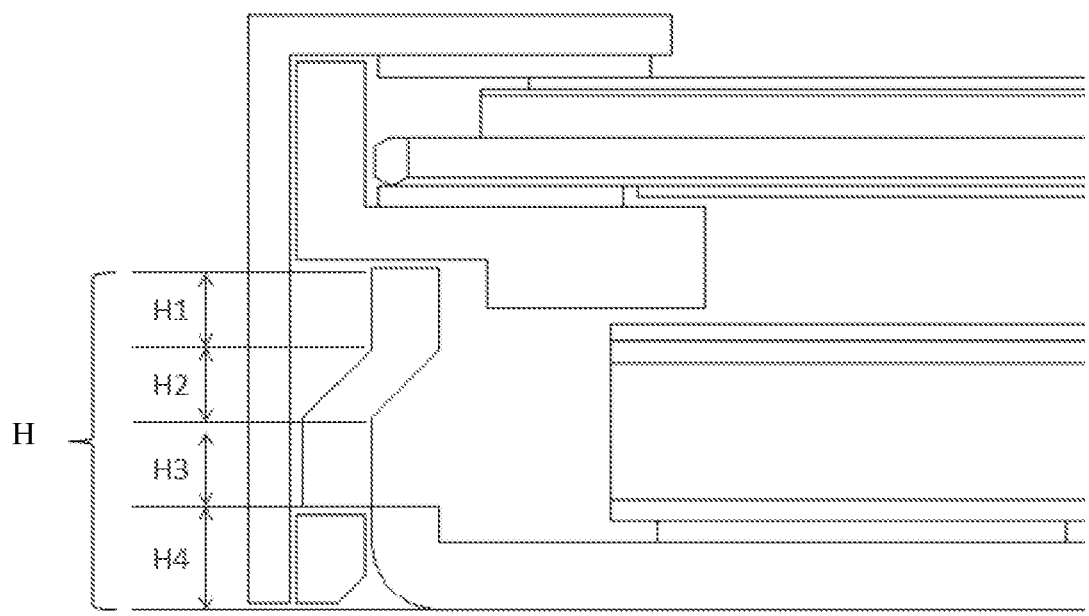
FIG. 2 is a schematic view of the dimension of a side plate of a rear shell of the display device in FIG. 1.
Figure 3:
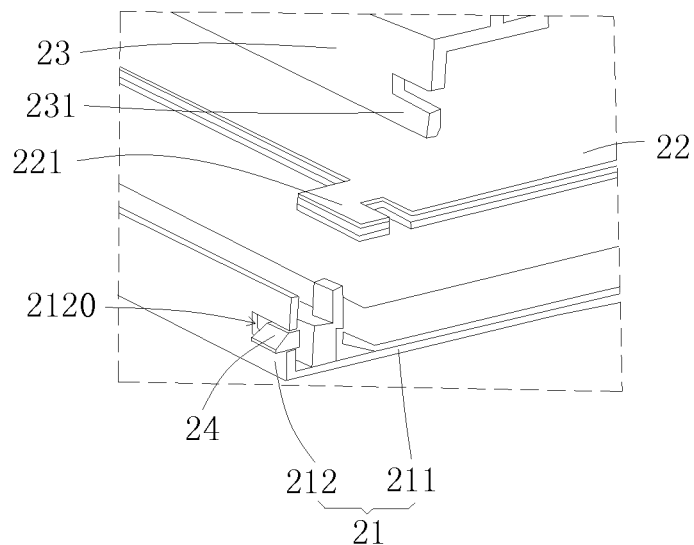
FIG. 3 is a schematic partial structural view of an embodiment of a backlight module of the invention.
Figure 4A:
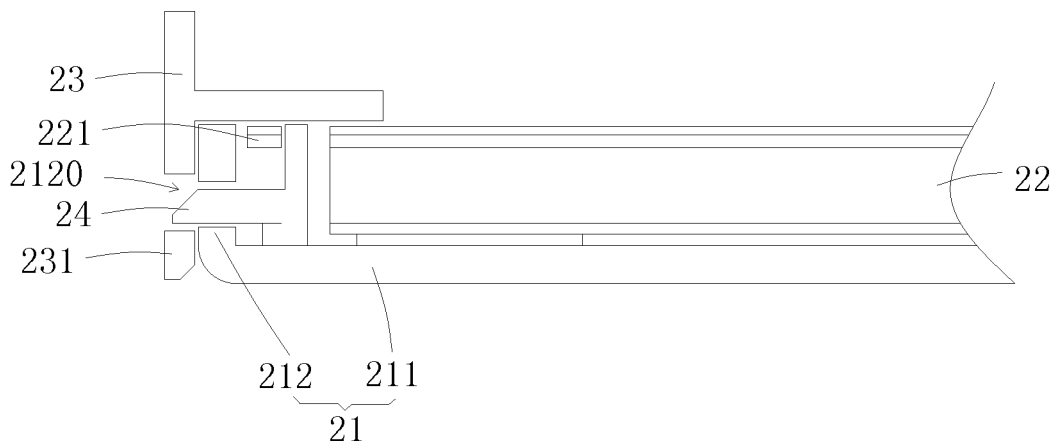
FIG. 4A is a schematic partial structural cross-sectional view of the backlight module in FIG. 3.

Referring to FIG. 3 and FIG. 4A, FIG. 3 is a schematic partial structural view of an embodiment of a backlight module of the invention, and FIG. 4A is a schematic partial structural view of the backlight module as shown in FIG. 3. The backlight module in this embodiment includes but not limited to a rear shell 21, an optical component set 22, a middle frame 23 and an engagement fitting 24.

In this embodiment, the rear shell 21 generally is manufactured by a heat-resistant material with good heat-dissipation performance and concretely may be formed with multiple (i.e., more than one) heat-dissipating holes or heat-dissipating grooves, etc. The rear shell 21 in this embodiment includes a back plate 211 and a side plate 212. The side plate 212 is disposed at the periphery of the back plate 211 and defines a receiving space (not labeled) for accommodating the optical component set 22 of the backlight module. The side plate is formed with an assembly hole 2120.

It should be noted that, the back plate 211 and the side plate 212 may be integrally formed, or connected together by engagement, screwing or riveting. The receiving space is an opened space and allows the optical component set 22 to be loaded therein and to set a shock-absorbing material therein for supporting the optical component set 22. The assembly hole 2120 may be a square or a round hole, the dimension thereof may be interference fit when engaging with a component, or is formed with internal screw thread to avoid unstable engagement caused by sliding. Of course, the backlight module in this embodiment may further include a backlight source and so on disposed between the optical component set 22 and the back plate 211, which is within the scope of understanding of those skilled in the art and thus will be not described in detail herein.

The optical component set 22 is formed with an ear-like structure 221 for realizing the fixing of the optical component set 22 by hanging, suspending or connecting.

The middle frame 23 in this embodiment is disposed engaging with the side plate 212 and for restricting the optical component set 22 in the receiving space. The middle frame 23 is formed with an engagement portion 231 extending toward the assembly hole 2120. The engagement portion 231 may be bar-shaped or hook-shaped, and is not limited herein.

Figure 5:
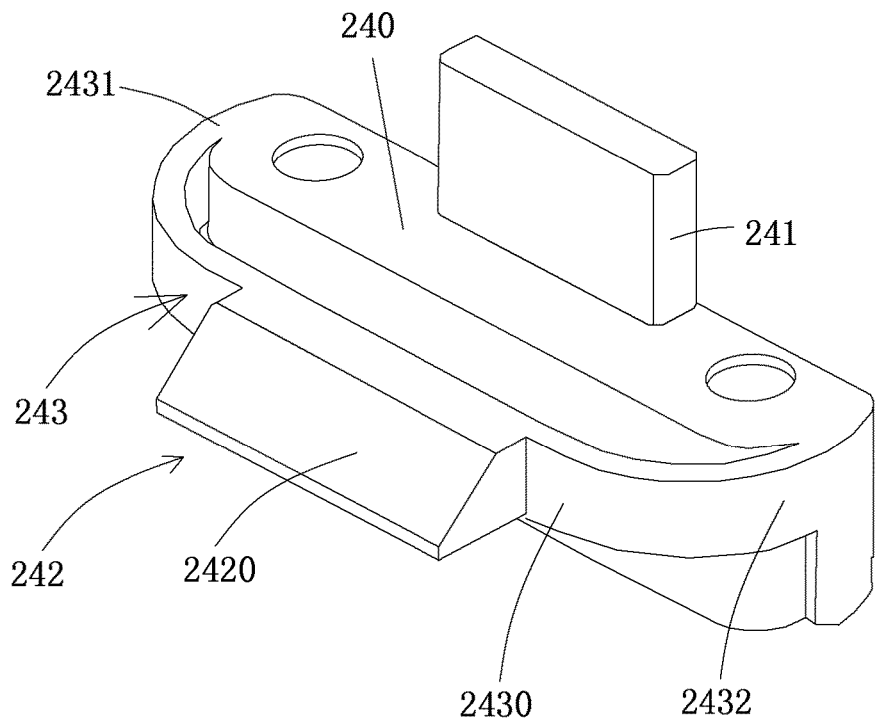
FIG. 5 is a schematic structural view of an embodiment of an engagement fitting of the invention.

The engagement fitting 24 is disposed in the receiving space and adjacent to the side plate 212. As shown in FIG. 5, the engagement fitting 24 in this embodiment includes a buckling member 241 and an engagement member 242 penetrating through the assembly hole 2120, the buckling member 241 is configured (i.e., structured and arranged) for buckling with the optical component set 22, and the engagement member 242 is configured for engaging with the engagement portion 231 of the middle frame 23, so as to achieve tight engagement of the rear shell 21, the middle frame 23 and the optical component set 22.

Concretely speaking, the engagement fitting 24 includes a main body 240 and an elastic member 243 connected to the main body 240. The engagement member 242 is formed protruding from the elastic member 243 toward the assembly hole 2120. A bottom surface of the main body 240 is disposed tightly in contact with the back plate 211 to thereby support a part of weight of the main body 240, the middle frame 23 and the optical component set 22. Preferably, the main body 240 is manufactured by a high structural strength material with certain elastic properties.

As shown in FIG. 5, the elastic member 243 includes a first end 2431, a second end 2432, and a deformable portion 2430 between the first end 2431 and the second end 2432. The first end 2431 and the second end 2432 are individually connected with the main body 240. The deformable portion 2430 is disposed spaced from the main body 240 and thereby an elastic stopper slot is formed therebetween. It is not difficult to be understood that, after the deformable portion 2430 is pressed to be deformed, the size of the elastic stopper slot gradually decreases until the deformable portion 2430 completely abutting on the main body 240, so as to provide a maximum elastic restoring force. Accordingly, this embodiment can achieve the maximum elastic force by use of the minimum structural volume.

It is noted that, a protruding portion of the engagement member 242 penetrating through the assembly hole 2120 and engaged with the engagement portion 231 is formed with a guiding structure 2420, which facilitates the protruding portion (not labeled) to withdraw into the assembly hole 2120 when the engagement portion 231 of the middle frame 23 presses the guiding structure 2420 during assembly and to eject from the assembly hole 2120 to engage with the engagement portion 231 when the assembly is completed. As shown in FIG. 4A, the guiding structure 2420 in this embodiment preferably is an inclined surface. During the assembly, the engagement portion 231 of the middle frame 23 presses starting from the end of the side plate 212, the end surface of the engagement portion 231 firstly contacts with the guiding structure 2420 to make the guiding structure 220 be deformed, owing to further pressing of the engagement portion 231, the guiding structure 2420 promotes the protruding portion to withdraw into the assembly hole 2120, at this time, the protruding portion and the deformable portion 2430 together are forced to move toward the main body 240. After the end surface of the engagement portion 231 completely goes across the guiding structure 2420, the elastic restoring force of the deformable portion 2430 makes the protruding portion of the engagement member 242 to restore toward the engagement portion 231 through the assembly hole 2120. At this time, by the engagement of the engagement member 242 with the engagement portion 231, the positioning between two individual elements is achieved.

In this embodiment, the buckling member 241 is formed extending from the main body 240 along a direction facing away from the back plate 211 and configured to buckle with the ear-like structure 221 of the optical component set 22. In other words, the buckling member 241 preferably is a protrusion structure. Of course, in other embodiment, for example the optical component set 22 is formed with a protrusion, and correspondingly the buckling member 241 is formed with a slot or a hole instead.

It should be noted that, the engagement fitting 24 in this embodiment is integrally formed, so as to increase the reliability of structural strength. In addition, the engagement fitting 24 is fixed on the back plate 211 by screwing, riveting, adhering or engagement. Preferably, the engagement fitting 24 is formed with at least two threaded holes and thereby is fixed on the back plate 211 by screws.

Figure 4B:
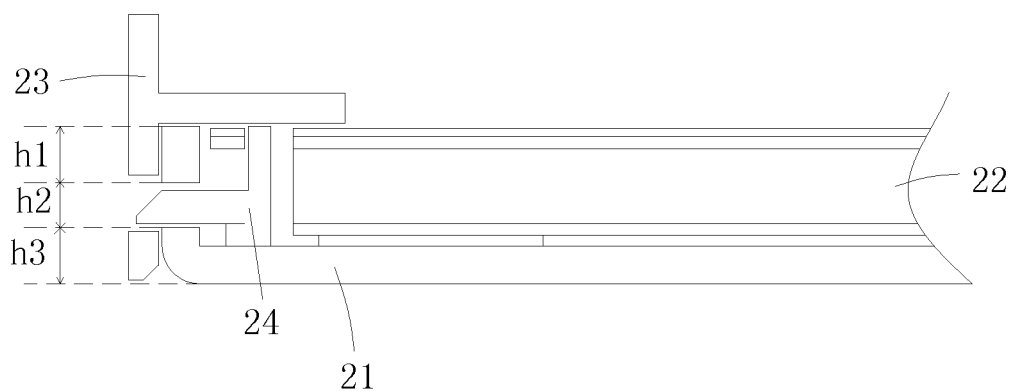
FIG. 4B is a schematic view of the dimension requirement of the backlight module in FIG. 4A.

It is indicated that, as shown in FIG. 4B, when uses the engagement fitting 24 of the backlight module in this embodiment, according to the requirement of molding process, it is assumed that a thickness of the rear shell 21 is T, related dimensions need to satisfy the following conditions that: a height h1 from the upper end of the assembly hole 2120 to the end of the side plate 212 is greater than or equal to 1.5 T, a height h2 from the upper end of the assembly hole 2120 to the lower end of the assembly hole 2120 (i.e., size in the height direction) is greater than or equal to 1.0 T, and a height h3 from the lower end of the assembly hole 2120 to the bottom surface of the rear shell 21 is greater than or equal to 1.5 T. In other words, the total height of the side plate 212 of the rear shell 21 is about 4 T, which reduces the necessary size of product in the thickness direction to a large extent and therefore is more beneficial to the slim design of product. In this embodiment, the "upper end" and "lower end" are orientation relationships corresponding to upper and lower in the drawing, which is within the scope of understanding of those skilled in the art and thus will be not limited herein.

Referring to FIG. 5, an embodiment of the invention further provides an engagement fitting 24 used for a backlight module. The engagement fitting 24 is configured to be disposed inside the rear shell 21 of the backlight module and adjacent to the side plate 212 of the rear shell 21. The engagement fitting 24 includes a buckling member 241 and an engagement member 242 penetrating through the side plate 212, the buckling member 241 is configured for buckling with the optical component set 22 of the backlight module, the engagement member 242 is configured for engaging with the middle frame 23 of the backlight module, so as to achieve tight engagement of the rear shell 21, the middle frame 23 and the optical component set 22.

As to detail structure and operational principle of the engagement fitting 24 in this embodiment, please refer to the related description of any one of the foregoing embodiments, which is within the scope of understanding of those skilled in the art and thus will be repeated herein.

Figure 6:
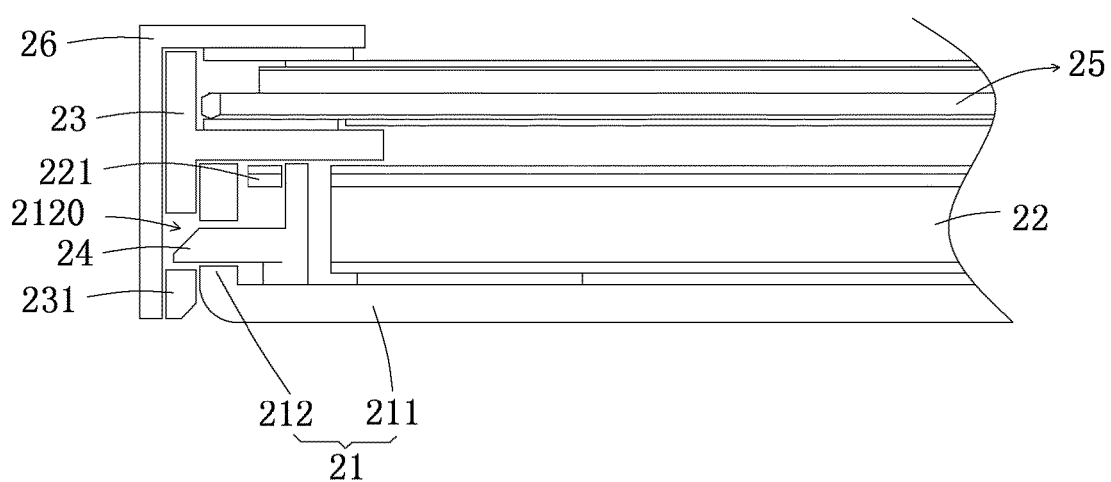
FIG. 6 is a schematic partial structural view of an embodiment of a display device of the invention, the display device employing the backlight module in FIG. 3.

Referring to FIG. 6, FIG. 6 is a schematic partial structural view of an embodiment of a display device of the invention. The display device in this embodiment adopts the backlight module as illustrated in FIG. 3.

In particular, the display device in this embodiment includes a display panel 25 and any one of the above described backlight modules. The display panel 25 is secured on the middle frame 23 and disposed opposite to the optical component set 22.

It is noted that, in the process of using, the backlight module in this embodiment employs multiple (i.e., more than one) engagement fittings 24 disposed spaced from each other.

In addition, the display device further includes a front frame 26 engaged with the middle frame 23 and configured for fixing the display panel 25 cooperative with the middle frame 23.

As to detail structure of the backlight module of the display device in this embodiment, please refer to the related description of the foregoing embodiments, and will not be repeated herein.

In summary, one or multiple embodiments of the invention provide the engagement fitting 24 and uses the engagement fitting 24 to realize the fixing of both the middle frame 23 and the optical component set 22, which can avoid the technical drawbacks of being difficult to achieve light, thin and simple of product caused by excessively large thickness and height of the side plate of the rear shell in the prior art. Accordingly, the invention not only can effectively simplify the structure of the backlight module but also can improve the structural strength and reduce the production cost.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A backlight module comprising:
a rear shell, comprising a back plate and a side plate, wherein the side plate is disposed at the periphery of the back plate and defines a receiving space for accommodating an optical component set of the backlight module, the side plate is formed with an assembly hole;
a middle frame, disposed engaging with the side plate and restricting the optical component set accommodated in the receiving space, wherein the middle frame is formed with an engagement portion extending toward the assembly hole;
an engagement fitting, disposed in the receiving space and adjacent to the side plate, wherein engagement fitting comprises a buckling member and an engagement member penetrating through the assembly hole, the buckling member is configured for buckling with the optical component set, the engagement member is configured for engaging with the engagement portion of the middle frame, and thereby achieving tight engagement of the rear shell, the middle frame and the optical component set;

wherein a protruding portion of the engagement member penetrating through the assembly hole and engaged with engagement portion is formed with a guiding structure, to thereby allow the protruding portion to withdraw into the assembly hole when the engagement portion presses the guiding structure during assembly and to eject from the assembly hole to engage with the engagement portion when the assembly is completed; the engagement fitting is fixed on the back plate by screwing, riveting, adhering or engagement.

2. A backlight module comprising:

a rear shell, comprising a back plate and a side plate, wherein the side plate is disposed at the periphery of the back plate and defines a receiving space for accommodating an optical component set of the backlight module, the side plate is formed with an assembly hole;

a middle frame, disposed engaging with the side plate and restricting the optical component set in the receiving space; wherein the middle frame is formed with an engagement portion extending toward the assembly hole;

an engagement fitting, disposed in the receiving space and adjacent to the side plate, wherein the engagement fitting comprises a buckling member and an engagement member penetrating through the assembly hole, the buckling member is configured for buckling with the optical component set, the engagement member is configured for engaging with the engagement portion of the middle frame, and thereby achieving tight engagement of the rear shell, the middle frame and the optical component set.

3. The backlight module as claimed in claim 2, wherein the engagement fitting comprises a main body and an elastic member connected to the main body, the engagement member is formed protruding from the elastic member toward the assembly hole.

4. The backlight module as claimed in claim 3, wherein the elastic member comprises a first end, a second end, and a deformable portion between the first end and the second end; the first end and the second end are individually connected with the main body, the deformable portion and the main body are disposed spaced from each other and thereby define an elastic stopper slot therebetween.

5. The backlight module as claimed in claim 4, wherein a protruding portion of the engagement member penetrating through the assembly hole and engaged with the engagement portion is formed with a guiding structure, to thereby facilitate the protruding portion to withdraw into the assembly hole when the engagement portion presses the guiding structure during assembly and to eject from the assembly hole to engage with the engagement portion when the assembly is completed.

6. The backlight module as claimed in claim 4, wherein the engagement fitting is fixed on the back plate by screwing, riveting, adhering or engagement.

7. The backlight module as claimed in claim 6, wherein the engagement fitting is formed with at least two threaded holes and thereby fixed on the back plate by screws.

8. A display device comprising a display panel and a backlight module as claimed in claim 7, wherein the display panel is secured on the middle frame and disposed opposite to the optical component set, the number of the engagement fitting is more than one, and the more than one engagement fittings are disposed spaced from each other.

9. The display device as claimed in claim 8, wherein the display device further comprises a front frame engaged with the middle frame to thereby fix the display panel cooperative with the middle frame.

10. The backlight module as claimed in claim 3, wherein a protruding portion of the engagement member penetrating through the assembly hole and engaged with the engagement portion is formed with a guiding structure, to thereby facilitate the protruding portion to withdraw into the assembly hole when the engagement portion presses the guiding structure during assembly and to eject from the assembly hole to engage with the engagement portion when the assembly is completed.

11. The backlight module as claimed in claim 3, wherein the buckling member is formed extending from the main body along a direction facing away from the back plate and configured for buckling with an ear-like structure of the optical component set.

12. The backlight module as claimed in claim 3, wherein the engagement fitting is fixed on the back plate by screwing, riveting, adhering or engagement.

13. The backlight module as claimed in claim 12, wherein the engagement fitting is formed with at least two threaded holes and thereby fixed on the back plate by screws.

14. A display device comprising a display panel and a backlight module as claimed in claim 13, wherein the display panel is secured on the middle frame and disposed opposite to the optical component set, the number of the engagement fitting is multiple, and the multiple engagement fittings are disposed spaced from each other.

15. The display device as claimed in claim 14, wherein the display device further comprises a front frame engaged with the middle frame to thereby fix the display panel cooperative with the middle frame.

16. The backlight module as claimed in claim 2, wherein a protruding portion of the engagement member penetrating through the assembly hole and engaged with the engagement portion is formed with a guiding structure, to thereby facilitate the protruding portion to withdraw into the assembly hole when the engagement portion presses the guiding structure during assembly and to eject from the assembly hole to engage with the engagement portion when the assembly is completed.

17. The backlight module as claimed in claim 2, wherein the engagement fitting is fixed on the back plate by screwing, riveting, adhering or engagement.

18. The backlight module as claimed in claim 17, wherein the engagement fitting is formed with at least two threaded holes and thereby fixed on the back plate by screws.

* * * * *